(12) United States Patent
McAlister

(10) Patent No.: US 7,321,489 B2
(45) Date of Patent: Jan. 22, 2008

(54) HARD DRIVE CARRIER

(75) Inventor: Robert Roy McAlister, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/077,777

(22) Filed: Mar. 11, 2005

(65) Prior Publication Data

US 2005/0157464 A1 Jul. 21, 2005

Related U.S. Application Data

(63) Continuation of application No. 10/294,422, filed on Nov. 14, 2002, now Pat. No. 6,876,547.

(51) Int. Cl.
*G06F 1/16* (2006.01)
(52) U.S. Cl. ...................... 361/685; 312/333
(58) Field of Classification Search ................ None
See application file for complete search history.

(56) References Cited

U.S. PATENT DOCUMENTS

| | | | |
|---|---|---|---|
| 5,229,919 A | 7/1993 | Chen | 361/685 |
| 5,262,923 A | 11/1993 | Batta et al. | 361/685 |
| 5,507,650 A | 4/1996 | Larabell | 439/61 |
| 5,566,383 A | 10/1996 | Gildea et al. | 361/685 |
| 5,652,695 A | 7/1997 | Schmitt | 361/685 |
| 5,668,696 A | 9/1997 | Schmitt | 361/685 |
| 5,682,277 A | 10/1997 | Hanson | 360/97.01 |
| 5,691,879 A | 11/1997 | Lopez et al. | 361/685 |
| 6,049,451 A | 4/2000 | Schmitt et al. | 361/685 |
| 6,052,278 A | 4/2000 | Tanzer et al. | 361/685 |
| 6,064,569 A * | 5/2000 | Sands et al. | 361/685 |
| 6,088,221 A | 7/2000 | Bolognia | 361/685 |
| 6,088,222 A | 7/2000 | Schmitt et al. | 361/686 |
| 6,122,165 A | 9/2000 | Schmitt et al. | 361/685 |
| 6,166,901 A | 12/2000 | Gamble et al. | 361/685 |
| 6,193,339 B1 | 2/2001 | Behl et al. | 312/223.2 |
| 6,231,224 B1 | 5/2001 | Gamble et al. | 362/551 |
| 6,233,143 B1 | 5/2001 | Gamble et al. | 361/685 |
| 6,302,714 B1 | 10/2001 | Bolognia et al. | 439/157 |
| 6,407,913 B1 | 6/2002 | Peachey et al. | 361/685 |
| 6,442,021 B1 | 8/2002 | Bolognia et al. | 361/685 |
| 6,483,107 B1 | 11/2002 | Rabinovitz et al. | 361/683 |
| 6,560,098 B1 | 5/2003 | Beinor, Jr. et al. | 361/685 |
| 6,603,657 B2 | 8/2003 | Tanzer et al. | 361/685 |
| 6,636,422 B1 | 10/2003 | Tanzer et al. | 361/685 |
| 6,661,651 B1 | 12/2003 | Tanzer et al. | 361/685 |
| 6,876,547 B2 * | 4/2005 | McAlister | 361/685 |
| 2001/0001529 A1 | 5/2001 | Behl et al. | 312/223.1 |
| 2004/0085722 A1 | 5/2004 | Tanzer et al. | 361/683 |

FOREIGN PATENT DOCUMENTS

| | | |
|---|---|---|
| EP | 0 965 992 | 12/1999 |
| WO | WO 96/16575 | 6/1996 |

* cited by examiner

*Primary Examiner*—Lisa Lea-Edmonds
(74) *Attorney, Agent, or Firm*—Baker Botts L.L.P.

(57) ABSTRACT

A flexible drive carrier is disclosed. The drive carrier includes flexible elements that accommodate variations in sizes of hard drives as well as variations in computer chassis. The drive carrier forms a precise fit within a computer chassis. A drive carrier that does not accommodate a hard drive is also disclosed.

12 Claims, 6 Drawing Sheets

HARD DRIVE CARRIER

This application is a continuation of U.S. application Ser. No. 10/294,422 filed Nov. 14, 2002 now U.S. Pat. No. 6,876,547.

FIELD

This invention relates, in general, to information handling systems, and, more particularly, to hard drive assemblies included in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a hard drive that is coupled to the chassis of a computer or a drive bay. A hard drive is typically disposed on a carrier assembly, and the carrier assembly is inserted, via a guide rail system, into a bay in a computer chassis. A electromagnetic energy interference (EMI) shield is sometimes a part of a carrier assembly and functions to shield the hard drive from any EMI interference, such as EMI emanating from the drive motor.

A hard drive carrier assembly serves at least two functions. The hard drive carrier accommodates a hard drive and mechanically mates with a drive bay in a computer chassis. The mechanical connection between the hard drive carrier and the drive bay of the computer chassis are affected by the manufacturing tolerances of the hard drive housed within the carrier, the computer chassis, and the drive bay, which is housed within the computer chassis. The manufacturing tolerances of typical hard drives are within the range of about 0.015 inches. The dimensions of computer chassises and drive bays may vary between manufacturers and within a single manufacturer. The mechanical fit between the hard drive carrier and the drive bay may also be affected by pressure exerted by a computer chassis or drive bay on the hard drive carrier assembly. Over time, this pressure may distend the hard drive carrier assembly. Therefore, obtaining a precise fight between a drive assembly and both the hard drive and the computer chassis over time is difficult to achieve.

SUMMARY

In accordance with the present disclosure, one implementation of a hard drive carrier features a drive carrier that comprises one or more rails. The rails are capable of coupling a hard drive to a drive bay. The drive carrier also includes a bezel. The one or more rails are coupled to the bezel. The drive carrier also includes a flexible cam lever. One end of the cam lever is coupled to the bezel and the other end includes a latch that is biased open in its free state. In its closed state, the latch couples the cam lever to the second end of the bezel. The flexible cam lever and the overbiased latch permit the drive assembly to accommodate various sizes of hard drives and computer chassis.

One technical advantage of the disclosed carrier assembly is a reduction in the manufacturing cost. Some computer systems that use the disclosed invention may have hundreds or thousands of drive bay slots. A reduction in the cost of ownership of the computer system may result from using the drive carrier.

Another technical advantage is the development of a drive carrier for a small form factor computer chassis. As the size of the computer chassis is reduced, the effects of variations in the size of a computer chassis, as well as the increased angular velocity of a hard drive may reduce the reliability of the hard drive.

Another technical advantage is that the drive carriers are hot swappable. Depending on the application, it may be advantageous in many computer systems to replace a single disk drive while the computer system is running.

Another technical advantage is that the hard drive carrier accommodates both storage and server products. The hard drive carrier may be inserted in either a drive array or directly into a computer chassis. A hard drive carrier that is used across multiple platforms may have a decrease cost through increased application.

Another technical advantage is that the hard drive carrier is keyed to prevent unmatched hard drive/chassis mating. This ensures that the correct drive type, e.g., SCSI or fiber channel disk drive, is inserted into a computer system or a drive bay. If disk drives other than SCSI or fiber channel are used, the keying feature can be adapted to accommodate these types as well.

Another technical advantage is that the hard drive carrier provides about 1 Gigahertz (2 Gigabit) compliant EMI shielding. Given that storage and server products may include hundreds or thousands of disk drives, a large amount of electromagnetic energy is emitted by the amalgamation of hard drives in these products. Furthermore, developments in information handling systems, including computer systems and hard drives, have resulted in an increase in the bandwidth of the emitted EMI.

Another technical advantage is that the hard drive carrier provides rotational vibration dampening. When inserted in a computer chassis, the rotational axis of a hard drive may not be parallel to each side rail, thus creating rotational vibrations during operation. The flexible elements of the hard drive carrier and the undersizing of distance between chassis latching/stop features ensure a tight drive fit and provide a dampening characteristic that helps reduce rotational vibrations in a hard drive carrier.

Another technical advantage is that the hard drive carrier accommodates variations in bard drive and chassis size. A hard drive carrier that can accept tolerances in hard drives and computer chassis will be more reliable, cost effective, and perform more efficiently over its lifetime.

Other features and advantages will become apparent from the description and claims that follow.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
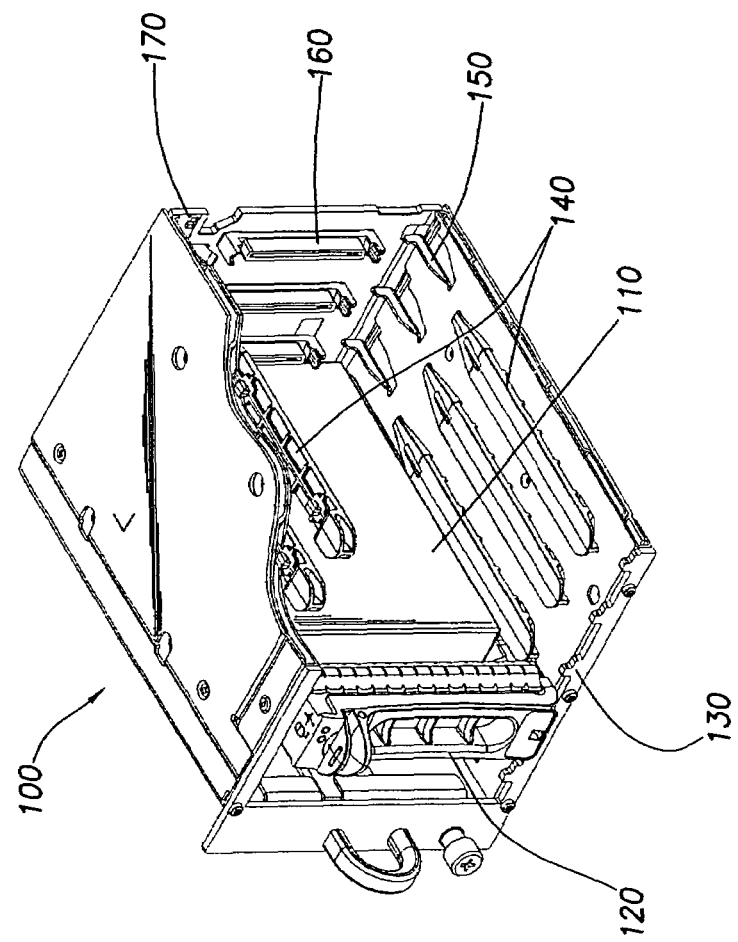
FIG. 1 is a perspective view of a drive bay that includes a drive carrier assembly.

FIG. 1 shows one example of a storage device of an information handling system, a computer drive bay 100. Computer drive bay 100 may be a component of a computer system such as server computer system, a desktop computer system, a workstation, or a network storage device. Computer drive bay 100 includes at least one disk drive 110 mounted in a drive carrier assembly 120. Carrier guide rails 140 are attached to two opposing surfaces of the drive bay. The front panel 130 of the carrier includes a keying feature that allows the insertion of a compatible disk drive into the drive bay 100. In one implementation, the front panel permits insertion of a SCSI disk drive. In another implementation, the front panel permits insertion of a fiber channel disk drive. The keying feature is not limited to selecting either SCSI or fiber channel disk drives, but may be adaptable to any type of hard drive.

A carrier stop feature 150 provides a physical reference point for the insertion of a drive carrier assembly into drive bay 100. Carrier stop feature 150 is one of two points between which the drive carrier assembly 120 is locked into place. The second reference point is the front panel 130. Drive carrier assembly 120 is inserted into drive bay 100 until it abuts carrier stop feature 150, which prevents its further insertion into the drive bay and then is locked in place by a latching mechanism of the drive carrier. Also shown in FIG. 1 are a backplane connector 160 and backplane LEDs 170. Backplane connector 160 electrically couples disk drive 110 to the information handling system. Diagnostics functions may be included in the drive bay in the form of backplane LEDs 170. Example diagnostic functions include detecting access of a hard drive, detecting incorrect hard drive connection, and detecting a hard drive error.

Figure 2D:
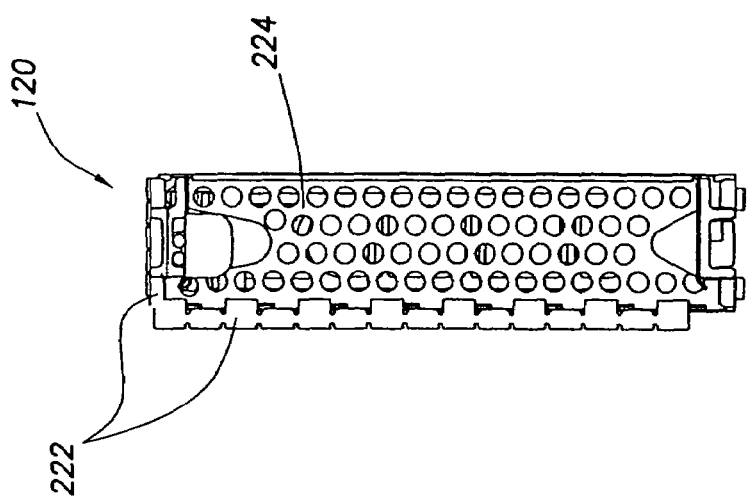
FIG. 2D is an end view of one implementation of a drive carrier assembly.
Figure 2A:
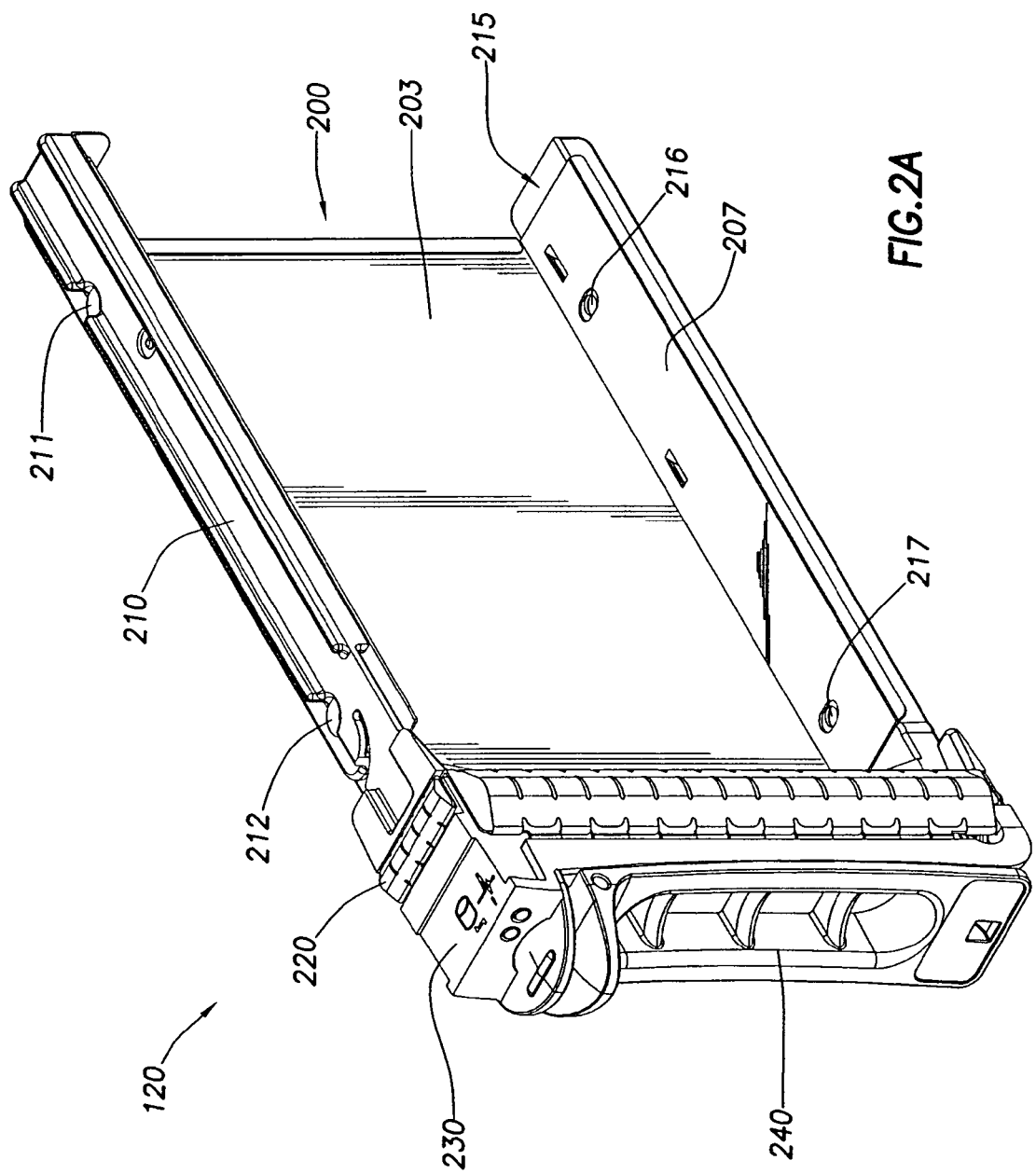
FIG. 2A is a perspective view of one implementation of a drive carrier assembly.
Figure 2B:
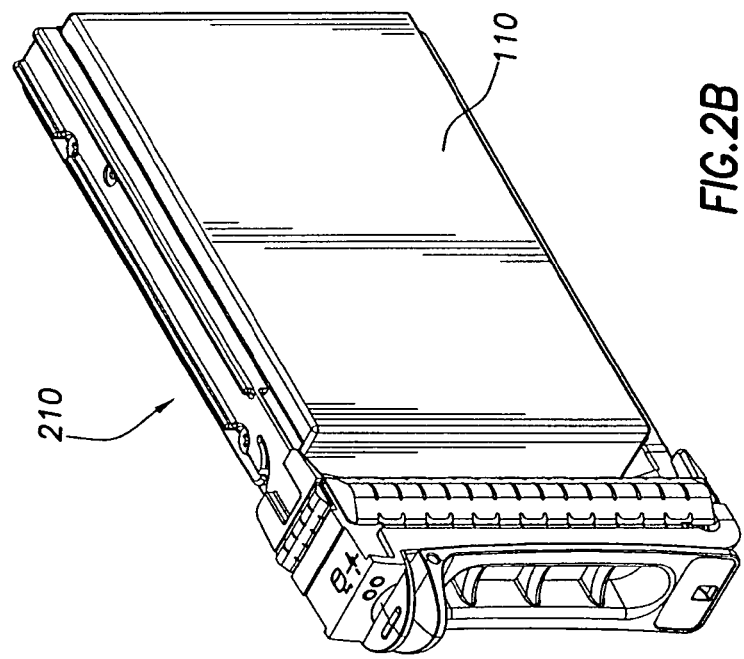
FIG. 2B is a perspective view of a hard drive connected to one implementation of a drive carrier assembly.

A perspective view of one implementation of drive carrier assembly 120 is shown in FIG. 2A. This view shows two guide rails 210 and 215, frame 200, which comprises bottom surface 203, and two sides 204 (not shown) and 207, EMI shield 220, bezel 230, and cam lever 240. As shown in FIG. 2B, frame 200 of drive carrier assembly accommodates a hard drive 110. Hard drive 110 is disposed on bottom surface 203. Guide rail 210 includes two holes, 211 and 212, through which screws attach hard drive 110 to guide rail 210. Likewise, guide rail 215 includes two holes 216 and 217, through which screws attach hard drive 110 to guide rail 215.

Figure 2C:
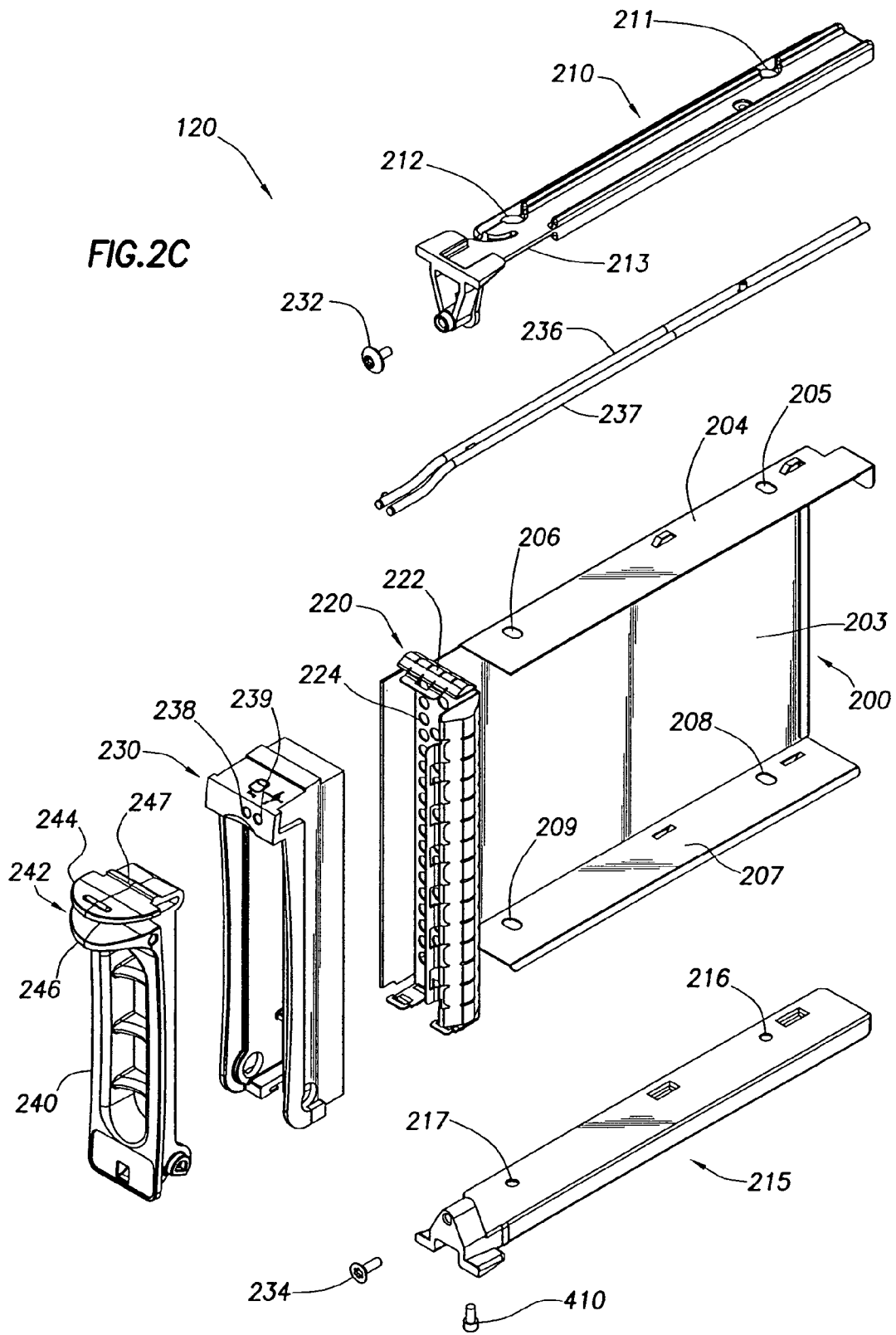
FIG. 2C is an exploded view of one implementation of a drive carrier assembly.

FIG. 2C is an exploded view of a drive carrier assembly shown in FIG. 2A. A frame 200 is adapted to receive computer disk drive 110. Frame 200 includes a bottom surface 203 upon which a computer disk drive 110 is placed. Frame 200 also includes two side walls, 204 and 207. Side walls 204 and 207 are oriented perpendicular to the bottom surface 203. In one implementation the distance between the two side walls 204 and 207 is set equal to the size of the smallest drive to be accommodated by drive assembly 120. Sidewall 204 includes holes 205 and 206 through which screws attach hard drive 110 to guide rail 210. Likewise sidewall 207 includes holes 208 and 209 through which screws attach hard drive 110 to guide rail 215. The invention is not limited by the method of attaching hard drive 110 to carrier assembly 120. In another implementation fasteners other than screws may be used. In still another implementation, the drive assembly may be assembled without the use of mechanical fasteners such as screws.

Drive assembly 120 includes rails 210 and 215 adjacent to side walls 204 and 207. The combination of rails 210 and 215 and the carrier guide rails 140 facilitate insertion of drive carrier assembly 120 into drive bay 100. Rails 210 and 215 mate with the carrier guide rails 140 of the computer chassis as drive assembly 120 is inserted into the chassis. In one implementation, side rail 210 floats, e.g., side rail 210 is flexible, and this flexibility minimizes any bowing that occurs in the bottom surface 203 as a result of mismatched drive size. For example, if a disk drive with a width that is larger than the distance between the two side walls is inserted into drive assembly 120, the side walls will be pushed away from each other. By providing flexibility in the side rails, any bowing that occurs in the bottom surface 203 as a result of mismatched drive size is minimized. In this fashion, variations in hard disk drive widths may be accommodated without sacrificing the integrity of the drive carrier assembly 120. In another implementation, rail 215 floats and may be flexible. In still another implementation, both rails may float be flexible.

The manufacturing tolerances of hard drives vary among and within manufacturers. As a result, it is likely that a carrier assembly will accommodate a hard drive whose size does not match that of the carrier assembly. If, as a result of a mismatched hard drive, the shape of the carrier assembly bends or bows, the alignment of the hard disk drive to the mating connector or to the carrier assembly may become compromised. This misalignment may in turn create additional stresses on the disk drive, which may shorten the life span of the drive. Minimizing any bowing in the bottom surface 203 may increase the reliability of the disk drive assembly. By. undersizing the bottom surface 203 and permitting one or both side walls to flex outward when accommodating a drive that is larger than the distance between the two side rails, a reliable, variable size, variable width drive carrier may be produced.

In another implementation, the distance between side walls 204 and 207 may be set equal to the average size of the disk drive to be accommodated by the drive assembly 120. In still another implementation, the distance between side walls 204 and 207 may be set to the largest size of a disk drive to be accommodated by the drive assembly 120.

Multiple sources of electromagnetic radiation exist, and these sources may affect the operation of the hard drive. For example, a hard drive motor may emit electromagnetic radiation. Additionally, the environment surrounding a hard drive may contain electromagnetic sources. To increase the reliability of hard disk drives, an electromagnetic interference (EMI) shield 220 may be included in the drive carrier 120. EMI shield 220 serves at least two purposes. EMI shield 220 minimizes the amount of electromagnetic radiation exiting the carrier assembly 120 into the atmosphere. Additionally, EMI shield 220 minimizes the effect of external electromagnetic radiation on the carrier assembly 120. In one implementation, EMI shield 220 includes flexible shield fingers 222 and a shield 224. In another implementation, the shield may also include frame 200. FIG. 2D shows an end view of drive carrier assembly 120. Viewed from this perspective, one can see that shield 224 consists of a plurality of holes, and the shield fingers 222 are located on the top and left sides of shield 220. The holes function not only as an EMI filter, but also as a hard drive cooling mechanism by allowing air to enter and exit the space surrounding hard drive 110. The cooling rate, as well as the amount of EMI blockage may be controlled by adjusting the number and size of the holes in shield 220. The shield, including the flexible shield fingers, provide a tight EMI shield coupling between adjacent carrier assemblies 120 and accommodates variations in hard drive widths and drive bay or chassis dimensions without sacrificing carrier integrity.

Returning to FIG. 2C, one can see that coupled to EMI shield 218 is a bezel 230. In one implementation, a truss head screw 232 attaches bezel 230 to flexible guide rail 210. A slot may be fabricated in bezel 230 to permit guide rail 210 to move relative to bezel 230. For example, flexible rail 210 and screw 232 may slide across the surface of bezel 230 to accommodate variations in hard drive width without sacrificing carrier integrity. As guide rail 210 flexes, the screw 232 slides within a slot fabricated in bezel 230. The amount of flexibility in guide rail 210 is determined in part by the size of the slot in bezel 230, and by the reduction in the thickness of guide rail 210 at flex region 213. This feature allows the drive assembly 120 to accommodate, in addition to drive size variances, variances in computer chassis sizes.

If a drive assembly 120 is inserted into a computer chassis, and the width or height of the computer chassis is less than the distance between the two guide rails, upper guide rail 210 will be pushed inward toward the bottom surface 203. Moreover, if the drive size increases to a size that is larger than the distance between side walls, 204 and 207, upper guide rail 210 will flex away from the interior of bottom plate 203 to accommodate a larger disk drive. The amount of flexibility in the drive carrier assembly 120 is based in part on the amount of movement of guide rail 210 relative to bezel 230. The combination of truss-head fastener 232, compliant top rail 210 and flexible EMI 220 shield permit the carrier to expand to accommodate variances in drive carrier widths.

It may be desirable to align guide rail 215 with bezel 230. In one implementation, a flat head fastener and countersunk bezel though hole provides positive alignment between carrier bezel 230 and lower rail 215. Screw 234 attaches bottom rail 215 to bezel 230 forming a self-locating bezel/guide rail configuration. Screw 234 provides positive location between bezel 230 and rail 215 during assembly with minimal features. This implementation minimizes the need for secondary alignment features such as the use of a pin and a matching hole to ensure proper alignment between bezel 230 and guide rail 215.

As shown in FIG. 2C, light pipes 236 and 237 may be included in drive assembly 120. The light pipes transmit light from backplane LEDs 170 to the front of bezel 230. The light pipes may be inserted directly into holes 238 and 239 located at the top of bezel 230. The light pipes may serve multiple functions. For example, a light may indicate that a disk drive is in use. The light may also be used for diagnostic purposes, such as detection of a hard drive error or incorrect coupling of the computer to the hard drive. Although two light pipes are shown in FIG. 2C, it is understood that the number of light pipes need not be limited to two, but may be zero or more.

A cam lever 240 latches the drive carrier assembly 120 into drive bay 100. One end of cam lever 240 is pivotally connected to one end of bezel 230. The other end of cam lever 240 contains an overbiased latch 242. An overbiased latch is a latch that is biased open; e.g., in its free state, the latch is open. The overbiased latch is used to couple cam lever 240 to bezel 230. In one implementation the overbiased latch 242 comprises two surfaces, 244 and 246, which form an angle of approximately five degrees relative to one another. The size of the angle between surfaces 244 and 246 need not be limited to five degrees, but may be in the range of greater than zero to less than 90 degrees. In its free, unlatched state, cam lever 240 is larger than the opening of bezel 230. Because the latch 242 is flexible and biased open, as cam lever 240 is inserted into the bezel, latch surface 244 flexes toward latch surface 246. In this fashion, the latch is self-aligning. When the cam lever 240 is engaged in bezel 230, the latch is compressed against the bezel to ensure retention of cam lever 240. In one implementation, the latching of the cam lever 240 to the bezel 220 creates an audible noise or click. The noise provides a positive feedback mechanism signaling that drive carrier assembly 120 is properly latched to drive bay 100. Within a tolerance based in part upon the amount of overbias present in the latch, the cam lever 240 will latch to bezel 230. When in the latched position, latch surface 244 maintains positive pressure against bezel 230 ensuring that the latch remains locked over time, even if the dimensions of cam lever 240 and/or bezel 230 change over time.

When plastic is subjected to continuous pressure, its dimensions may change; i.e., plastic creep may occur. Pressure may result, for example, when a drive carrier assembly 120 is latched in a driver bay 100. Due to continuous pressure applied to surface 244 from bezel 230, latch 242 may change shape, yielding a reduction in the amount of pressure applied to surface 244. As the latch changes shape because of plastic creep, the click that occurs following latching will be less audible. The maximal plastic creep will occur when top surface 244 is exerting minimal pressure on bezel 230. Furthermore, surface 244 includes a raised element 247 that, in combination with the overbiased latch 242, performs the latching function by preventing lever 240 from exiting bezel 230. When latch 242 is in its locked position, the effect of plastic creep, if any, on latch 242 is limited by the compliance of upper surface 244. Even in the presence of maximal plastic creep, the latch will maintain its latched position because of raised element 247. Thus, the overbias feature of cam lever 240 helps minimize any plastic creep that may occur over time.

A hard disk drive generates heat when operating. The shape of the cam lever 240 and the bezel 230 may also change due to the effect of heat. Over the course of time, the hard drives generate heat, and the heat may slightly change the shape of cam lever 240 and/or bezel 230. Depending on the amount of plastic sag that results from this heat, the latch may fail, and correspondingly the hard drive will not be locked into the drive bay, due to an inability to contact bezel 230. Latch failure due to heat-induced plastic sag is minimized by the use of a latch that is biased open. Any change in dimensions of bezel 230 and cam lever 230 should be accommodated by the overbiased property of the latch. In one implementation, the amount of positive bias present in latch 242 is dependent in part on the amount of expected variations in dimensions as a result of the manufacturing process and operating conditions.

The overbiased latch simplifies manufacturability of the cam lever. The flexibility of latch 242 permits a reduction in the manufacturing tolerance of cam lever 240 or bezel 230. For example, the use of injection mold technology to fabricate the cam lever and the bezel may introduce some shrinkage in the cam lever or the bezel. Because the amount of shrinkage that occurs following the cooling process is difficult to predict, the tolerance from the pivot point to the latching point in some drive carrier assemblies is critical. If this tolerance is not maintained, the latch may fail.

Variations in the length of cam lever 240 or the bezel 230 may be accounted for by use of overbiased latch 242. The flexibility in latch 232 ensures effective latching by accommodating variations in bezel 230 and cam lever 240 dimensions. This mechanism provides a positive snap when closing and maintains engagement through the life of the drive carrier assembly, even in the presence of plastic creep. In this fashion, the effects of tolerance variations, such as shrinkage due to the injection molding process, will be minimized, and an effective and efficient latch will be produced.

In addition to being overbiased, the cam lever 240 may be compliant or pliable. A compliant cam lever may accommodate tolerance variations in both the drive carrier and chassis dimensions. A compliant cam lever should be made of a material that is has sufficient flex so that it does not break under pressure, but at the same time is sufficiently brittle so that it does not permanently deform and lose its springiness. A pliable cam lever permits design of a nominal interference fit between carrier and chassis to reduce hard drive rotational vibration. One implementation includes an amorphous blend of polycarbonate and acrylonitrile-butadiene-styrene (PC/ABS) polymers. The specific properties of the polymer may be altered by varying the ratio of PC and ABS. PC and ABS.

Figure 3A:
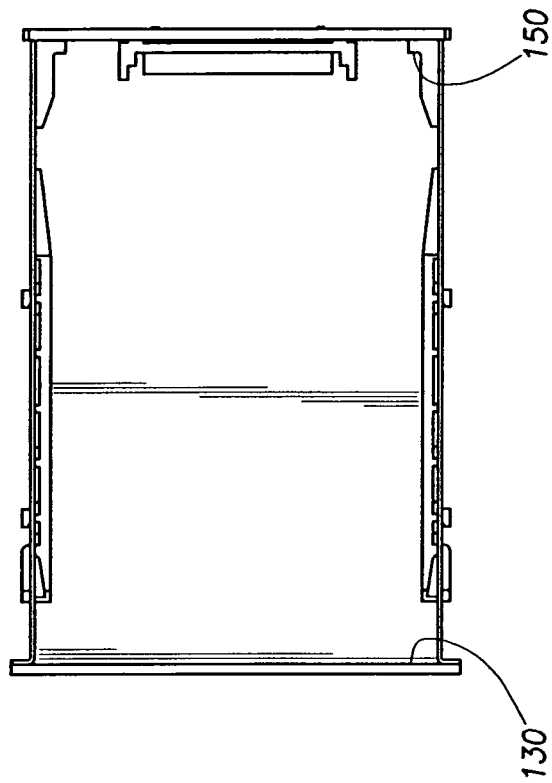
FIG. 3A is a side view of a drive bay.
Figure 3B:
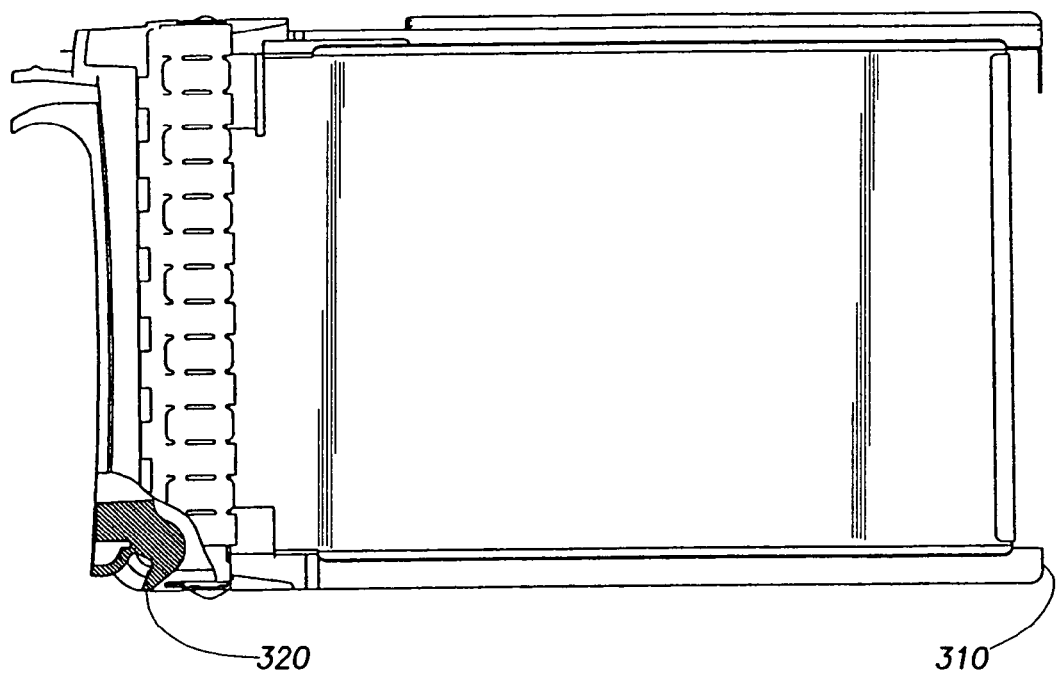
FIG. 3B is a side view of one implementation of a drive carrier assembly.

Turning to FIG. 3A, which is a side view of one example drive bay 100, drive bay 100 will accept a drive carrier assembly that fits between the locking features on the front (front bezel 130) and back (carrier stop feature 150) of a drive carrier. In one implementation, the nominal distance between front bezel 130 and carrier stop feature 150 is 7.069 inches. An implementation of carrier assembly 120 shown in FIG. 3B shows a drive carrier with a nominal length of 7.089 inches (between reference points 310 and 320) and a tolerance of 0.15 inches. Here cam lever 240 is designed to flow or bend to accommodate variances in drive bay dimensions. Thus, in this implementation the drive carrier is oversized by approximately 0.020 inches. Because cam lever 240 shown in FIG. 3B is designed to accommodate variations of about 20 to 40 thousands of an inch, drive carrier assembly 120 will form a tight fit with drive bay 100. To accommodate 20 to 40 thousands of an inch, cam lever 240 may be fabricated to be slightly larger (by about 20 to 40 thousands of an inch) than the corresponding dimension of bezel 230. Thus, cam lever 240 is slightly bowed in a concave shape. When latched to an undersized drive bay, cam lever 240 will flow or bend away from drive bay 100. In this fashion, the face of cam lever 240 will become less curved and more straight. An oversized drive carrier assembly with a compliant cam lever enhances the antirotation character of driver carrier assembly 120. In this fashion, a firm fit is formed between driver carrier assembly 120 and the drive bay 100 even in the presence of plastic creep. The drive bay 100 shown in FIG. 3A and the carrier assembly 120 shown in FIG. 3B are only examples and are illustrative of one implementation of a carrier assembly. The physical dimensions of a drive carrier 120 are not limited to those shown in FIG. 3B.

Figure 4:
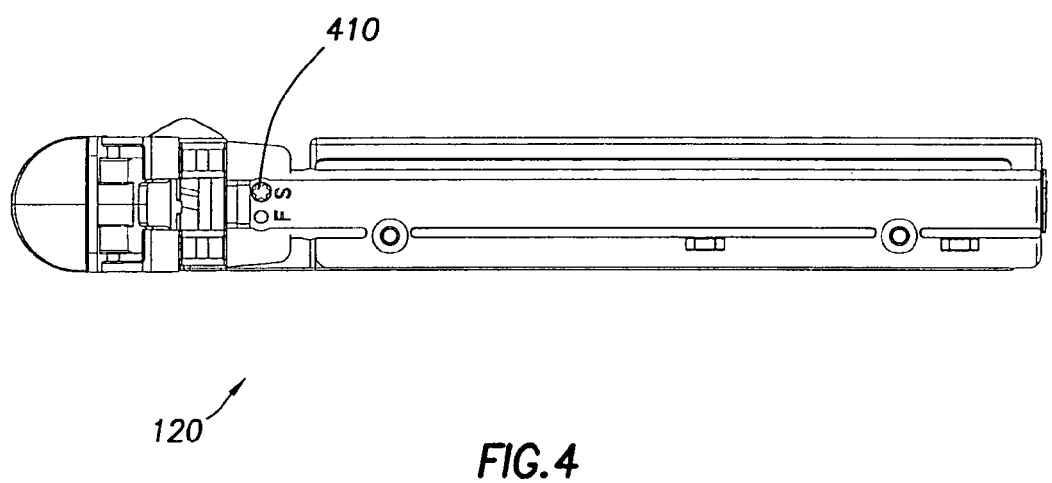
FIG. 4 is a bottom view of one implementation of a drive carrier assembly.

Drive carriers typically accommodate a variety of hard drives. To prevent using an incorrect drive connector and possibly damaging the drive connectors, driver carrier assembly 120 may also include a key 410 to ensure that the correct type of disk drive is inserted into drive bay 100. Drive carrier assembly 120 includes a SCSI/FC keying mechanism that includes a keying fastener 410 and a toothed chassis bezel 130. Key 410 is associated with a type of hard drive. FIG. 4 shows a bottom view of part of a drive carrier assembly keyed to a SCSI hard drive. Here the keying fastener 410 is placed in the hole labeled "S." The combination of a keyed carrier and a matched chassis bezel prevents unmatched hard drive and chassis components from being assembled. Likewise, screw 410 may be inserted in the hole marked "F" to accommodate a fiber channel drive. The drive carrier assembly key mates with the keying features of front panel 130 to ensure that the correct type of disk drive is inserted into drive bay 100. It is noted that the keying feature is not limited to SCSI or fiber channel hard drives, but may be adapted to any type of hard drive.

As shown in FIG. 1, a drive bay may accommodate more than one drive carrier assembly. In some computer systems, the number of required system hard drives may be less than the number of drive bay slots. The absence of hard drives in a drive carrier bay will affect the cooling profile of hard drives contained in a drive bay. For example, an empty drive slot in the drive bay would function as a conduit or plenum through which most of the cooling air would flow. Therefore, the drives adjacent to the empty slot would receive most of the cooling air, and the other drives would receive little cooling air. A prolonged reduction in cooling will stress the hard drives with an eventual end result being failure in the disk drives due to improper cooling. Furthermore drives not properly cooled can function as a heat source for any other drive. Thus, even drives adjacent to the empty slot may not be properly cooled. As a result, each slot in a hard drive carrier should be populated by either a carrier assembly or a carrier blank to minimize drive failure due to improper cooling.

To simulate the effect of a drive carrier assembly, and its associated hard drive, inserted into a drive bay, a carrier blank 500 may be inserted into the drive bay. The carrier blank simulates the gap between hard drives, which in one implementation may be about a tenth of an inch. Carrier blank 500 does not accommodate a disk drive. Frame 505 of carrier blank consists of a bottom surface 503, and two side surfaces 510 and 515, which function as guide rails. Frame 505 is not limited to a specific type of material, and may be fabricated from materials such as plastics or other polymers, or ever metallic materials. Because carrier blank 500 does not accommodate variable size hard drives, the side rails need not be flexible. The side surfaces 510 and 515 of carrier blank 500 should be fabricated such that it can be inserted into drive bay 100. Carrier blank 500 also includes an EMI shield 520, bezel 530, and cam lever 540. To minimize design and manufacturing costs, cam lever 240 of carrier assembly 120 may be used as the cam lever of carrier blank 500.

EMI shield 520 is similar to EMI shield 220 shown in FIG. 2. The major difference between these two EMI shields, however, is that carrier blank 500 does not accommodate a hard drive. Therefore, to simulate the effect of air flow through a carrier assembly that accommodates a hard drive, the number of holes in the shield is reduced.

Bezel 530 may be fabricated to have the same dimensions as bezel 230. Structurally, however, bezel 530 is different from bezel 230. The number of air flow holes in bezel 420 is reduced to match the corresponding holes in the shield. The number of holes is dependent upon the cooling requirements of the hard drives. Additionally, because carrier blank 500 does not include a hard drive, no associated diagnostic functions are necessary. Therefore, bezel 530 need not accommodate any diagnostic light pipes.

Figure 5:
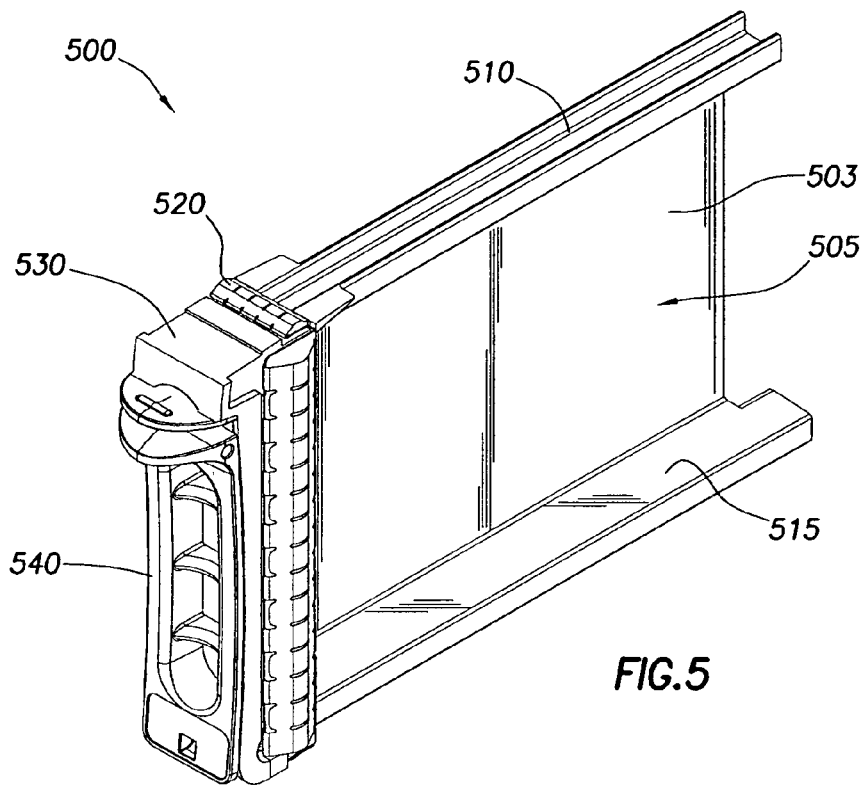
FIG. 5 is a perspective view of a driver carrier blank that does not accommodate a disk drive.
Figure 6:
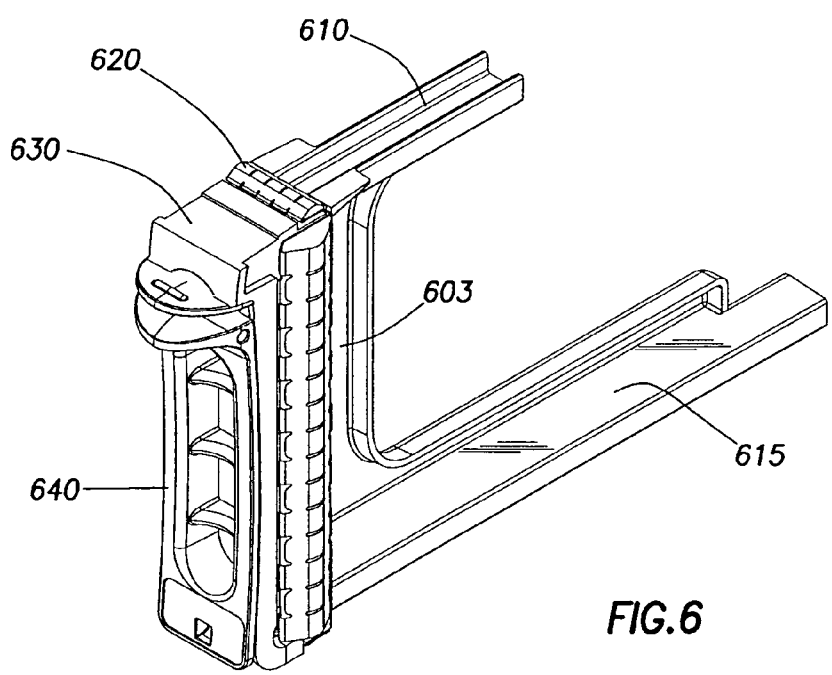
FIG. 6 is a perspective view of a drive carrier blank that does not accommodate a disk drive.

Another implementation of a carrier blank is shown in FIG. 6. Here EMI shield 620, bezel 630, and cam lever 640 are similar to that shown in FIG. 2C. The distance between the side walls 610 and 615 is chosen so that carrier blank 600 may be inserted into a drive bay. The major difference between the carrier blanks shown in FIGS. 5 and 6 is that the amount of material required to fabricate carrier blank 600 is reduced, resulting in a potential cost savings. Because a portion of surface 603 is excised, as compared to surface 503, carrier blank 600 may function as more of a cooling source than carrier blank 500. In another implementation, the effect of the size variation of frame dimensions on air flow within carrier blank 600 is accounted for in the design of bezel 620. To account for this increase in cooling, bezel 630, and shield 620, may be fabricated with a reduced number of holes, as compared with bezel 530 and shield 520.

One implementation of a hard drive assembly provides a standardized one inch hard drive carrier that incorporates the following feature set: low cost, small form factor, hot-swappable, applicable in both storage and server products, keyed to prevent unmatched hard drive/chassis mating (ensures either SCSI or fiber channel disk drive is inserted into computer system), provides a 1 Gigahertz (2 Gigabit) compliant EMI shielding, provides rotational vibration dampening, and accommodates variations in hard drive and chassis size.

Although this invention disclosed implementations using a drive bay, the claim scope is not intended to be limited by the use of a drive bay. In another implementation, a drive carrier assembly may be inserted directly into a computer chassis.

Although the present disclosure has been described in detail, it should be understood that various changes, substitutions, and alterations can be made hereto without departing from the spirit and the scope of the invention as defined by the appended claims.

What is claimed is:

1. A carrier for a storage device, comprising:
a bezel having a first end and a second end; and
a cam lever having a first end pivotally coupled to the bezel proximate the first end of the bezel and a second end including a latch for coupling the cam lever to the bezel at a location proximate the second end of the bezel, wherein the latch comprises:
a first surface; and
a second surface positioned proximate the first surface;
wherein the first surface and the second surface may be pivoted relative to one another to reduce the distance between the first surface and the second surface for the purpose of coupling the cam lever to the bezel, and
wherein the cam lever is comprised of a compliant material to permit the cam lever to be distended when the latch of the cam lever is coupled to the bezel.

2. The carrier of claim 1, further comprising,
a first rail coupled to the first end of the bezel;
a second rail coupled to the second end of the bezel;
an electromagnetic interference shield coupled between the first rail and the second rail, wherein the shield includes a plurality of openings formed therein for the passage of air through the shield.

3. The carrier of claim 2, wherein the shield is flexible.

4. The carrier of claim 1, wherein at least one of the first rail or the second rail is flexible.

5. The carrier of claim 1, wherein the latch is biased in an open state.

6. The carrier of claim 1, wherein the latch is sized such that an audible noise is emitted as the latch is coupled to the bezel.

7. A carrier for a storage device, comprising:
a bezel having a first end and a second end; and
a cam lever having a first end pivotally coupled to the bezel proximate the first end of the bezel and a second end including a latch for coupling the cam lever to the bezel at a location proximate the second end of the bezel, wherein the latch comprises:
a first surface; and
a second surface flexibly coupled to the first surface; and
wherein the first surface and the second surface may be flexed relative to one another to decrease the distance between the first surface and the second surface for the purpose of coupling the cam lever to the bezel, and
wherein the cam lever is comprised of a compliant material to permit the cam lever to be distended when the latch of the cam lever is coupled to the bezel.

8. The carrier of claim 7, wherein the latch is biased in an open state.

9. The carrier of claim 7, wherein the latch is sized such that an audible noise is emitted as the latch is coupled to the bezel.

10. A carrier for a storage device, comprising:
a frame sized to receive the storage device;
a bezel having a first end coupled to the frame and a second end coupled to the frame; and
a cam lever having a first end pivotally coupled to the bezel proximate the first end of the bezel and a second end including a latch for coupling the cain lever to the bezel at a location proximate the second end of the bezel, wherein the latch comprises:
a first surface; and
a second surface flexibly coupled to the first surface; and wherein the first surface and the second surface may be flexed relative to one another to decrease the distance between the first surface and the second surface for the purpose of coupling the cam lever to the bezel, and wherein the cam lever is comprised of a compliant material to permit the cam lever to be distended when the latch of the cam lever is coupled to the bezel.

11. The carrier of claim 10, wherein the latch is biased in an open state.

12. The carrier of claim 10, wherein the latch is sized such that an audible noise is emitted as the latch is coupled to the bezel.

* * * * *